(12) United States Patent
Zee et al.

(10) Patent No.: US 6,233,164 B1
(45) Date of Patent: May 15, 2001

(54) PROTECTION CIRCUIT FOR A SWITCHED-MODE POWER SUPPLY

(75) Inventors: Kum Yoong Zee, Johor (MK); Kian Meng Koh; Seng Huat Ng, both of Singapore (SG)

(73) Assignee: Thomson Multimedia S.A., Boulogne Cedex (FR)

( * ) Notice: Subject to any disclaimer, the term of this patent is extended or adjusted under 35 U.S.C. 154(b) by 0 days.

(21) Appl. No.: 09/431,507

(22) Filed: Nov. 1, 1999

(30) Foreign Application Priority Data

Nov. 11, 1998 (DE) .................................. 98121390

(51) Int. Cl.[7] .......................... H02M 7/122; H02M 3/335
(52) U.S. Cl. ..................... 363/56.03; 363/19; 363/132
(58) Field of Search ................. 363/56, 49, 60, 363/19, 21, 142, 17, 97, 98, 132

(56) References Cited

U.S. PATENT DOCUMENTS 3,911,352    10/1975    Slack .
4,283,759    8/1981    Koiki et al. .
4,504,775    3/1985    Becker .
5,867,373  * 2/1999    Lohrer et al. ........................ 363/19

FOREIGN PATENT DOCUMENTS 4032629    4/1992    (DE) .
0336392    10/1989   (EP) .
0808015    11/1997   (EP) .

* cited by examiner

*Primary Examiner*—Rajnikant B. Patel
(74) *Attorney, Agent, or Firm*—J. S. Tripoli; J. J. Laks; J. J. Kolodka

(57) ABSTRACT

The protection circuit comprises a storage capacitor which is coupled with a terminal of a secondary winding which charges said storage capacitor during the on-interval of the switching transistor. During the off-interval of the switching transistor the charge of the storage capacitor is fed to the driver stage or the control capacitor for closing or keeping closed the switching transistor when one of the secondary windings has a short circuit.

12 Claims, 2 Drawing Sheets

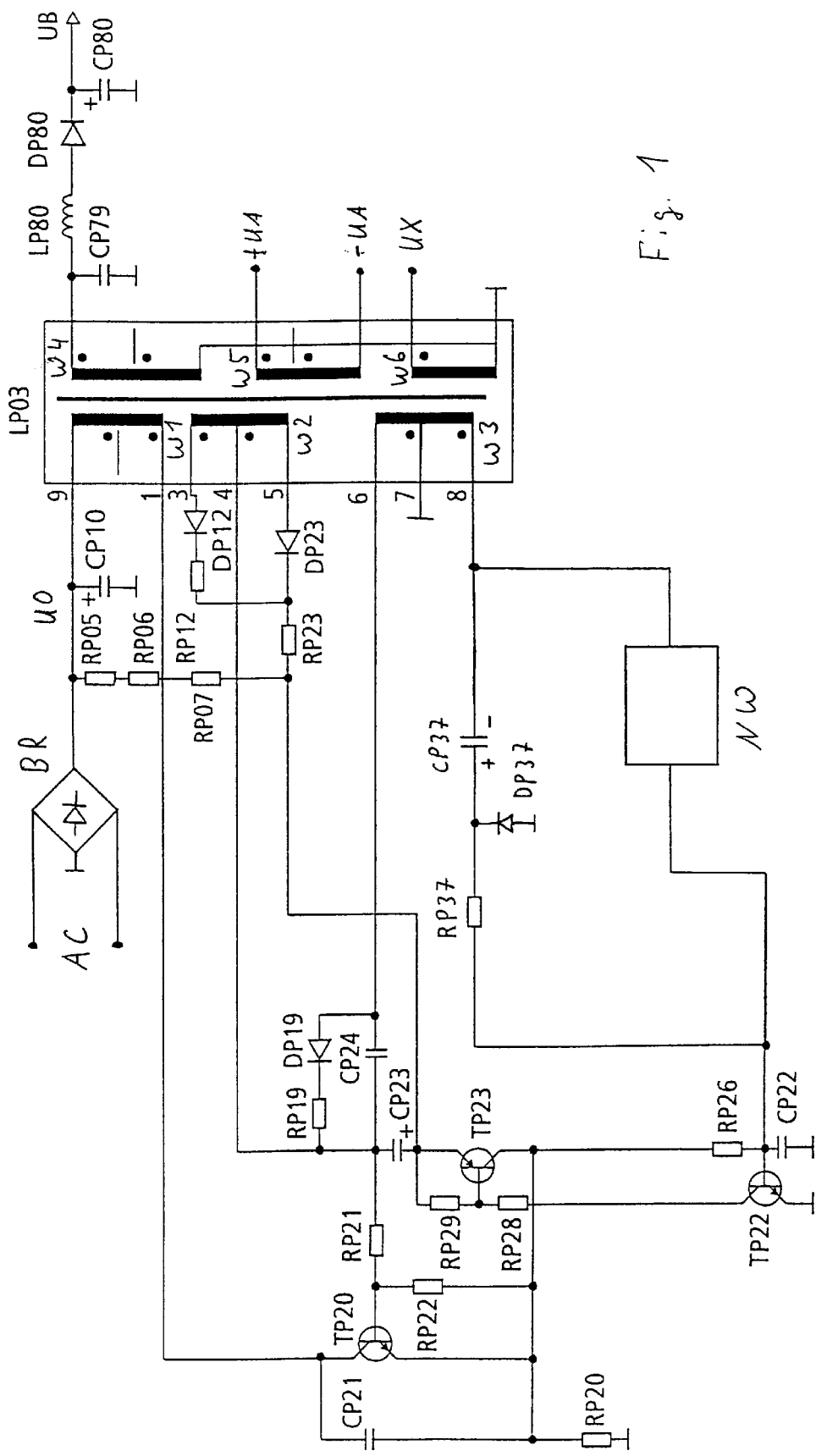

PROTECTION CIRCUIT FOR A SWITCHED-MODE POWER SUPPLY

BACKGROUND

The present invention relates to a protection circuit for a switched-mode power supply comprising a transformer with a primary winding and secondary windings, a switching transistor in series with said primary winding and a driver stage. Instead of the driver stage the power supply may have a control capacitor for the regulation. A switched-mode power supply of this kind is disclosed for example in EP-A-0 808 015.

In case of a short circuit the switching transistor of the power supply may remain in an unstable state not being completely closed during the off-interval. In this case the switching transistor may dissipate a power being to high which will damage it. This is especially the case for a self-oscillating switched mode power supply which has no driver circuit providing defined switching voltages and which may continue to oscillate in an undefined manner during said short circuit.

BRIEF SUMMARY OF THE INVENTION

The object of the present invention is to specify a protection circuit for a switched-mode power supply as stated above. The protection circuit of the invention comprises a storage capacitor being coupled with one end to a terminal of one of the secondary windings providing a charging voltage for the storage capacitor during the conducting interval of the switching transistor. The charge of this capacitor is fed to a driver stage or a control capacitor during the off-interval of the switching transistor to provide a voltage for switching off and/or keeping closed the switching transistor in case of a short circuit at one of the secondary windings. This additional charge of the charging capacitor guarantees that the switching transistor is completely off during the whole off-interval to avoid damaging of the switching transistor. In case of a short circuit at one of the outputs of the switched mode power supply no voltage is present at the secondary windings as long as the diode of said voltage output is conducting. But very often an output voltage at a secondary winding of the primary side is required for closing the switching transistor. This is especially the case for self oscillating switch mode power supplies working in flyback mode.

The storage capacitor may be coupled advantageously to a control capacitor which may be part of the driver stage and which is charged by a regulating current provided during operation of the power supply. With the other end the storage capacitor can be connected to a terminal of a secondary winding which provides a negative voltage during the on-interval of the switching transistor by which the storage capacitor is charged. When the switching transistor switches off, the terminal of said winding switches from negative to 0 V which transfers the charge of the charging capacitor to the control capacitor and provides herewith a positive voltage or current for keeping the switching transistor closed.

The invention can be used, in particular, for television sets and video recorders.

BRIEF DESCRIPTION OF THE DRAWINGS

An advantageous exemplary embodiment of the invention is explained in the following text with reference to a schematic circuit diagram, in which:

FIG. 1 shows a circuit diagram of a switched-mode power supply comprising a protection circuit, FIG. 2a an output voltage of the power supply during normal operation, and FIG. 2b an output voltage of the power supply during a short circuit.

DESCRIPTION OF PREFERRED EMBODIMENTS

Figure 2A:
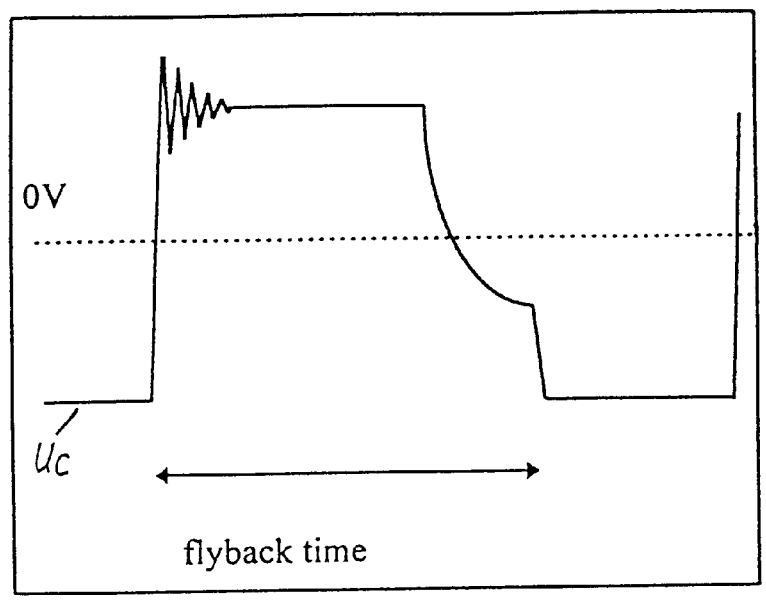

The circuit diagram in FIG. 1 shows a mains voltage connection AC downstream from which a bridge rectifier BR is connected for rectification of the AC voltage. This rectified voltage UO is smoothed by a large capacitor CP10 and applied across a first primary winding W1 with terminals 9, 1 of a transformer LP03, a collector-emitter path of a switching transistor TP20, and a low-resistance resistor RP20 for current detection. The transformer LP03 has secondary windings W2, W3 with connections 3, 4, 5 and with connections 6, 7, 8 arranged at the primary side as well as secondary windings W4, W5, W6 for producing stabilised secondary voltages UB, ±UA and UX. These are used, for example, in a television set for supplying the deflection stage, the audio section and electronic circuits.

The switched-mode power supply operates on the flyback converter principle with a switched-on interval and an off-interval of the switching transistor TP20. The off-interval is also called flyback phase. The power supply may have also an oscillation phase at the end of the off-interval as described in EP-A-0 808 015. During the switched-on phase, a current is built up in the primary winding W1 which produces a magnetisation in the transformer LP03. After a certain magnetisation level has built up, the switching transistor TP20 is switched off. In the off-interval which now follows, the magnetisation of the transformer LP03 is transmitted to the secondary windings W2–W6 and is thus reduced. During the transition from the switched-on phase to the off phase, the voltages which are present at the terminals 3, 4, 5 of the winding W2 and at the terminals 6 and 8 of the winding W3 are each reversed, with the terminal 7 being connected to ground.

A damping capacitor CP21 is connected in parallel with the collector and emitter of the switching transistor TP20. This capacitor CP21 is used to avoid switching spikes and is charged when the switching transistor TP20 is switched off. If the magnetisation of the transformer LP03 falls below a specific value in the off-interval, then oscillation takes place between the primary winding W1 and the capacitor CP21. This characterises the oscillation phase. During this oscillation phase, the collector voltage of the switching transistor TP20 periodically falls to a voltage between 0 to 150 V at the minimum of the oscillations, depending on the mains voltage, the turns ratio and the secondary load. The first minimum is the optimum time for switching the switching transistor TP20 through since the oscillation is strongest here and the oscillation time, which is not used for power transmission, is comparatively small. The switching-on losses of the switching transistor TP20 are therefore strongly reduced.

The base of the switching transistor TP20 is driven by a base current network which has to satisfy the following requirements: on the one hand, it has to provide a sufficiently high positive base current during the switched-on phase for good saturation of the switching transistor TP20, and, on the other hand, it has to supply a high negative base current for rapid switching off as well as a negative base voltage during the complete off-interval of the switching transistor TP20. The base current during the switched-on interval is provided via a forward winding 6, 7 of the secondary winding W3, a diode DP19 and low-resistance resistors RP19 and RP21.

The switching transistor TP20 is switched off via a driver stage by means of transistors TP22 and TP23. These are connected together via resistors RP26, RP28 and RP29 to form a Darlington circuit, which produces a very rapid switching through. If the collector-emitter current of the switching transistor TP20 rises gradually in the switched-through phase, the voltage across the resistor RP20 rises at the same time. The transistor TP22 and thus the transistor TP23 are switched through above a voltage of about 0.7 V across a control capacitor CP22. When the transistor TP23 switches through, the emitter and base of the switching transistor TP20 are connected to the terminals of the capacitor CP23, as a result of which its negative charge and voltage desaturate the switching transistor TP20 very rapidly as a result of the large negative base current, and thus switch it off very rapidly. The capacitor CP23 is charged again during each switched-on phase via the winding W2 and the diodes DP12 and DP23.

A control network NW connected to terminal 8 of winding W3 provides a further regulating current for charging capacitor CP22 which is dependent on the power consumption of the output stages. The switching off of the transistor TP20 is therefore controlled by the two currents provided by resistor RP20 and by network NW. When the voltage at the capacitor CP22 reaches approximately 0.7 V, then the transistor TP22 and thus the transistor TP23 are switched through, and the switching transistor TP20 is thus switched off, as already described above. The function of the network NW is described in detail in EP-A-0 808 015.

When the magnetisation in the transformer LP03 decays in the off phase, the flyback voltages are reduced and all the forward voltages rise. A positive voltage is now available at the terminal 6, and thus a positive current for switching the switching transistor TP20 on via capacitor CP24. The base current is maintained via diode DP19 and resistor RP19. Once the voltage at the terminal 8 of the winding W3 has fallen below 0 V no positive current is flowing any longer to control network NW and then transistor TP22 switches off and therewith transistor TP20 switches on. During the off-interval of the switching transistor TP20 the voltage at terminal 6 is negative.

In order to switch the switched-mode power supply on, a resistor chain RP05, RP06 and RP07 is connected between the positive terminal of the bridge rectifier BR and the positive terminal of the capacitor CP23 by which a starting current is provided.

To control capacitor C22 also a protection circuit is connected comprising a storage capacitor CP37, a diode DP37 and a resistor RP37. Capacitor CP37 is coupled with terminal 8 of winding W3 which provides a negative voltage during the on-interval of the switching transistor TP20 therefore charging CP37 negatively via diode DP37.

When the switching transistor TP20 switches off, the voltage at terminal 1 of the primary winding W1 rises and therefore the voltage at terminal 8 of winding W3 rises, therefore transferring the charge of capacitor CP37 via resistor RP37 to the control capacitor CP22. This is also the case when for example the output voltage UB has a short circuit. Diode DP80 is of course non conducting during the on-phase of the switching transistor TP20, also during the short circuit, therefore always a negative charging voltage at terminal 8 exists for charging capacitor CP37.

In the normal mode the charge of capacitor CP37 is also transferred to control capacitor CP22 during the off-interval but this is no problem for the regulating network NW because in the off-interval the transistor TP22 is conducting keeping the voltage at capacitor CP22 constant at 0,7 V and any additional charge from capacitor CP37 therefore does not change the voltage at control capacitor CP22. The capacitor CP22 is only charged during the on-interval and then the charging capacitor CP37 is sufficiently de-coupled by resistor RP37. The protection circuit can be set up by using only 3 passive elements. Other embodiments for example using transistors are also possible.

Figure 2B:
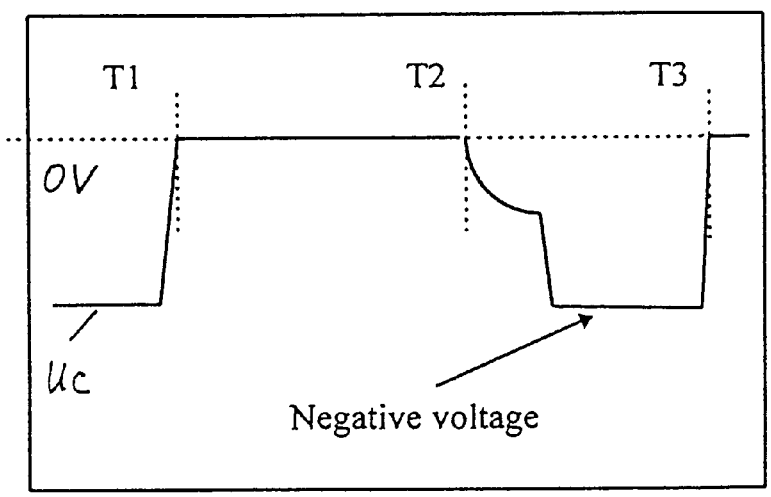

The invention is further explained with help of the voltage diagrams of FIGS. 2a and 2b. In FIG. 2a the voltage Uc at terminal 8 is shown for a normal operating mode. Similar voltages are also present at the flyback terminals of the windings W4, W5 and W6. During the flyback time or off-interval of the switching transistor TP20 the voltage Uc is positive. At the end of the flyback time the power supply may have an oscillation phase when the magnetisation of the transformer LP03 is reduced in which the voltage Uc may fall below 0 Volt. When the switching transistor TP20 is switched through the voltage at terminal 8 is negative.

FIG. 2b shows the situation for the case of a short circuit at a flyback output terminal of the transformer LP03, for example UB has a short. Then in the flyback time during time points T1 to T2 no voltage is present at terminal 8 because of the short. But the negative voltage is still present during time points T2 and T3. During this time the charge capacitor CP37 is charged and when the voltage at terminal 8 rises to 0 Volt at time point T3, the charge of capacitor CP37 is transferred to control capacitor CP22.

When the switching transistor TP20 is conducting the resistor RP20 always provides a voltage after some time for switching off switching transistor TP20. But the network NW may not provide any voltage to capacitor CP22 in case of a short circuit because terminal 8 provides no positive voltage in case of said short. Then the protection circuit with storage capacitor CP37 provides an additional charge to control capacitor CP22 so transistor TP22 can be firmly biased on and is kept closed during the flyback time.

In FIG. 1 a switched mode power supply is shown with mains isolation for use in a television receiver. But the protection circuit can be used for example also for a DC—DC converter. The power supply may comprise a MOSFET, a bipolar transistor or other transistor types as a switching transistor TP20. It may comprise a driver stage for the switching transistor TP20 which provides voltages and currents for switching on and off the switching transistor, for example using an integrated circuit, a driver stage for only switching off the switching transistor, or only a control capacitor for controlling a self oscillating switched mode power supply.

What is claimed is:

1. Protection circuit for a switched mode power supply working in a flyback mode comprising a transformer with a primary winding and secondary windings, a switching transistor in series with said primary winding and a driver stage with a control capacitor for controlling said switching transistor, said protection circuit comprising a storage capacitor which is coupled with a terminal of a secondary winding providing a charging voltage during the on-interval of said switching transistor, said storage capacitor being charged via a diode connected with a reference potential during said on-interval and the charge of said storage capacitor is fed to said control capacitor during the off-interval of said switching transistor for closing or keeping closed said switching transistor when one of said secondary windings has a short circuit.

2. Protection circuit according to claim 1, characterized in that the charge of said storage capacitor switches through a transistor of said driver stage and closing therewith said switching transistor in case of a short circuit.

3. Protection circuit according to claim 1, characterized in that said driver stage comprises a control capacitor to which the charge of said storage capacitor is transferred.

4. Protection circuit according to claim 1, characterized in that said storage capacitor is charged via a diode connected with a reference potential during said on-interval.

5. Protection circuit according to claim 1, characterized in that said terminal of said secondary winding provides a negative voltage during the on-interval.

6. Protection circuit according to claim 3, characterized in that said protection circuit is connected in parallel to a regulating network which charges said control capacitor for a regulation of said power supply.

7. Protection circuit according to claim 6, characterized in that said control capacitor is further charged by a resistor in series with said switching transistor.

8. Protection circuit according to claim 3, characterized in that the protection circuit comprises a resistive element which couples said storage capacitor to said control capacitor.

9. Protection circuit according to claim 1, characterized in that the switched mode power supply is a self-oscillating switched mode power supply working in flyback mode.

10. Switched mode power supply having a protection circuit, said switched mode power supply comprising a transformer with a primary winding and secondary windings, a switching transistor in series with said primary winding and a driver stage with a control capacitor for controlling said switching transistor, said protection circuit comprising a storage capacitor which is coupled with a terminal of a secondary winding providing a charging voltage during the on-interval of said switching transistor, said storage capacitor being charged via a diode connected with a reference potential during said on-interval and the charge of said storage capacitor is fed to said control capacitor during the off-interval of said switching transistor for closing or keeping closed said switching transistor when one of said secondary windings has a short circuit.

11. Switched mode power supply having a protection circuit according to claim 10 wherein the charge of said storage capacitor switches through a transistor of said driver stage and closes therewith said switching transistor in case of a short circuit.

12. Switched mode power supply having a protection circuit according to claim 10 wherein said terminal of said secondary winding provides a negative voltage during the on-interval.

* * * * *